United States Patent [19]
Fontana, Jr. et al.

[11] Patent Number: 5,901,018
[45] Date of Patent: * May 4, 1999

[54] MAGNETIC TUNNEL JUNCTION MAGNETORESISTIVE READ HEAD WITH SENSING LAYER AS REAR FLUX GUIDE

[75] Inventors: Robert Edward Fontana, Jr.; Stuart Stephen Papworth Parkin, both of San Jose; Ching Hwa Tsang, Suunyvale; Mason Lamar Williams, San Jose, all of Calif.

[73] Assignee: International Business Machines Corporation, Armonk, N.Y.

[ * ] Notice: This patent is subject to a terminal disclaimer.

[21] Appl. No.: 08/957,788

[22] Filed: Oct. 24, 1997

[51] Int. Cl.⁶ ......................................................... G11B 5/33
[52] U.S. Cl. .............................................................. 360/104
[58] Field of Search ...................................... 360/113, 126

[56] References Cited

U.S. PATENT DOCUMENTS

| | | | |
|---|---|---|---|
| 5,390,061 | 2/1995 | Nakatani et al. | 360/113 |
| 5,432,734 | 7/1995 | Kawano et al. | 360/113 X |
| 5,629,922 | 5/1997 | Moodera et al. | 369/126 |
| 5,650,958 | 7/1997 | Gallagher et al. | 365/173 |
| 5,712,612 | 1/1998 | Lee et al. | 360/113 X |
| 5,726,837 | 3/1998 | Nakatani et al. | 360/113 |
| 5,729,410 | 3/1998 | Fontana, Jr. et al. | 360/113 |
| 5,747,859 | 5/1998 | Mizushima et al. | 360/113 X |

*Primary Examiner*—John H. Wolff
*Attorney, Agent, or Firm*—Thomas R. Berthold

[57] ABSTRACT

A magnetic tunnel junction (MTJ) magnetoresistive read head for a magnetic recording system has the MTJ sensing or free ferromagnetic layer also functioning as a flux guide to direct magnetic flux from the magnetic recording medium to the tunnel junction. The MTJ fixed ferromagnetic layer and the MTJ tunnel barrier layer have their front edges substantially coplanar with the sensing surface of the head. Both the fixed and free ferromagnetic layers are in contact with opposite surfaces of the MTJ tunnel barrier layer but the free ferromagnetic layer extends beyond the back edge of either the tunnel barrier layer or the fixed ferromagnetic layer, whichever back edge is closer to the sensing surface. This assures that the magnetic flux is non-zero in the tunnel junction region. The magnetization direction of the fixed ferromagnetic layer is fixed in a direction generally perpendicular to the sensing surface and thus to the magnetic recording medium, preferably by interfacial exchange coupling with an antiferromagnetic layer. The magnetization direction of the free ferromagnetic layer is aligned in a direction generally parallel to the surface of the medium in the absence of an applied magnetic field and is free to rotate in the presence of applied magnetic fields from the medium. A layer of high coercivity hard magnetic material adjacent the sides of the free ferromagnetic layer longitudinally biases the magnetization of the free ferromagnetic layer in the preferred direction.

26 Claims, 10 Drawing Sheets

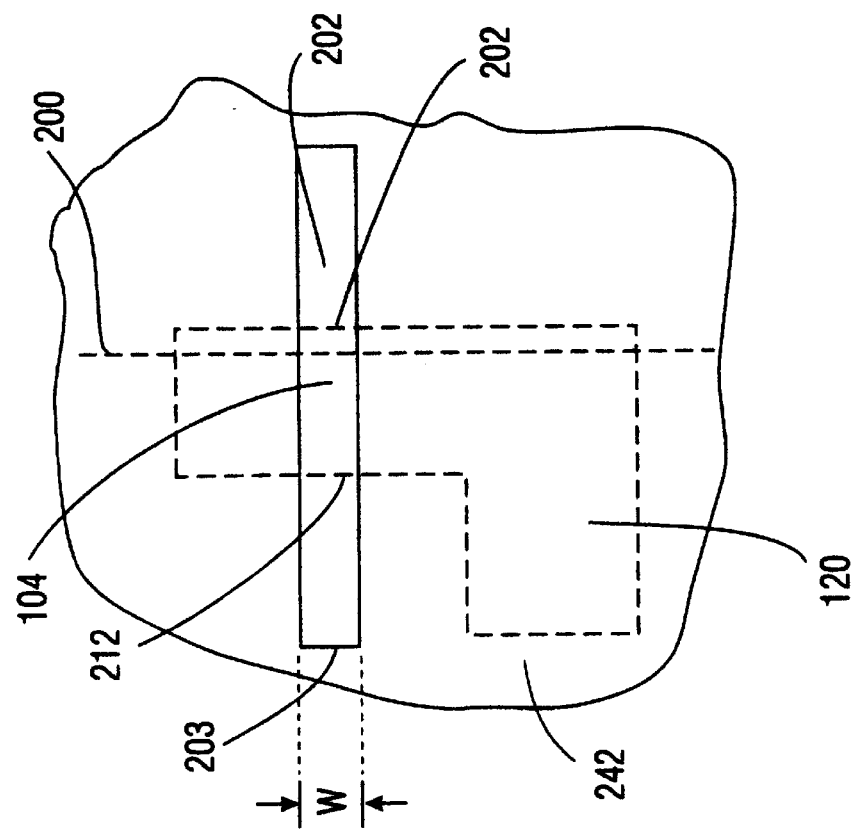
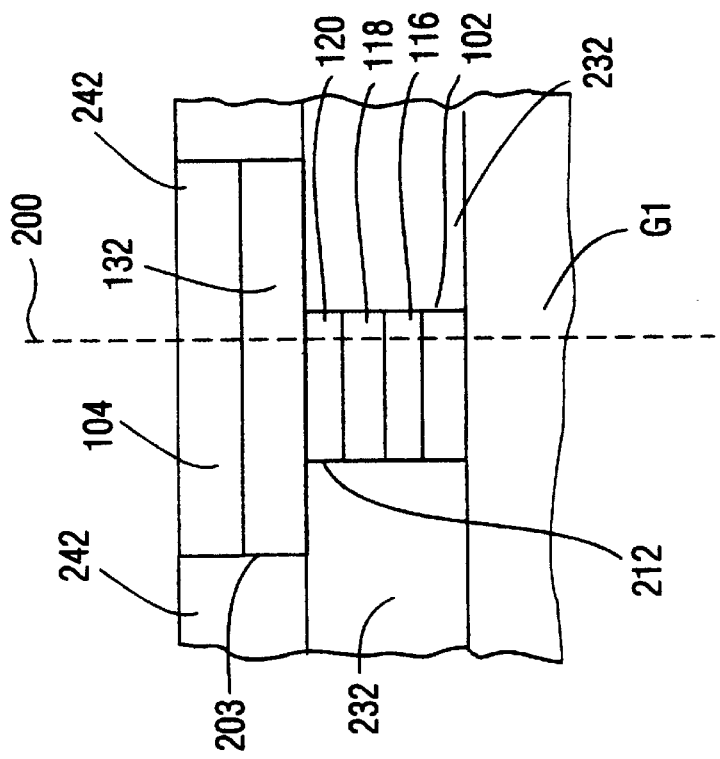
FIG. 6N
FIG. 6M

MAGNETIC TUNNEL JUNCTION MAGNETORESISTIVE READ HEAD WITH SENSING LAYER AS REAR FLUX GUIDE

RELATED APPLICATION

This application is related to concurrently filed application Ser. No. 08/957,699 titled "MAGNETIC TUNNEL JUNCTION MAGNETORESISTIVE READ HEAD WITH SENSING LAYER AS FLUX GUIDE", and application Ser. No. 08/957,787 titled "SHIELDED MAGNETIC TUNNEL JUNCTION MAGNETORESISTIVE READ HEAD".

TECHNICAL FIELD

This invention relates in general to magnetic tunnel junction (MTJ) devices, and more particularly to an MTJ device for use as a magnetoresistive (MR) head for reading magnetically-recorded data.

BACKGROUND OF THE INVENTION

A magnetic tunnel junction (MTJ) device is comprised of two ferromagnetic layers separated by a thin insulating tunnel barrier layer and is based on the phenomenon of spin-polarized electron tunneling. One of the ferromagnetic layers has a higher saturation field in one direction of an applied magnetic field, typically due to its higher coercivity than the other ferromagnetic layer. The insulating tunnel barrier layer is thin enough that quantum mechanical tunneling occurs between the ferromagnetic layers. The tunneling phenomenon is electron-spin dependent, making the magnetic response of the MTJ a function of the relative orientations and spin polarizations of the two ferromagnetic layers.

MTJ devices have been proposed primarily as memory cells for solid state memory. The state of the MTJ memory cell is determined by measuring the resistance of the MTJ when a sense current is passed perpendicularly through the MTJ from one ferromagnetic layer to the other. The probability of tunneling of charge carriers across the insulating tunnel barrier layer depends on the relative alignment of the magnetic moments (magnetization directions) of the two ferromagnetic layers. The tunneling current is spin polarized, which means that the electrical current passing from one of the ferromagnetic layers, for example, a layer whose magnetic moment is fixed or prevented from rotation, is predominantly composed of electrons of one spin type (spin up or spin down, depending on the orientation of the magnetic moment of the ferromagnetic layer). The degree of spin polarization of the tunneling current is determined by the electronic band structure of the magnetic material comprising the ferromagnetic layer at the interface of the ferromagnetic layer with the tunnel barrier layer. The first ferromagnetic layer thus acts as a spin filter. The probability of tunneling of the charge carriers depends on the availability of electronic states of the same spin polarization as the spin polarization of the electrical current in the second ferromagnetic layer. Usually, when the magnetic moment of the second ferromagnetic layer is parallel to the magnetic moment of the first ferromagnetic layer, there are more available electronic states than when the magnetic moment of the second ferromagnetic layer is aligned antiparallel to that of the first ferromagnetic layer. Thus, the tunneling probability of the charge carriers is highest when the magnetic moments of both layers are parallel, and is lowest when the magnetic moments are antiparallel. When the moments are arranged neither parallel nor antiparallel, the tunneling probability takes an intermediate value. Thus, the electrical resistance of the MTJ memory cell depends on the spin polarization of the electrical current and the electronic states in both of the ferromagnetic layers. As a result, the two possible magnetization directions of the ferromagnetic layer whose magnetization direction is not fixed uniquely define two possible bit states (0 or 1) of the memory cell.

A magnetoresistive (MR) sensor detects magnetic field signals through the resistance changes of a sensing element, fabricated of a magnetic material, as a function of the strength and direction of magnetic flux being sensed by the sensing element. Conventional MR sensors, such as those used as MR read heads for reading data in magnetic recording disk drives, operate on the basis of the anisotropic magnetoresistive (AMR) effect of the bulk magnetic material, which is typically permalloy ($Ni_{81}Fe_{19}$). A component of the read element resistance varies as the square of the cosine of the angle between the magnetization direction in the read element and the direction of sense current through the read element. Recorded data can be read from a magnetic medium, such as the disk in a disk drive, because the external magnetic field from the recorded magnetic medium (the signal field) causes a change in the direction of magnetization in the read element, which in turn causes a change in resistance of the read element and a corresponding change in the sensed current or voltage. In conventional MR read heads, in contrast to MTJ devices, the sense current is in a direction parallel to the ferromagnetic layer of the read element.

The use of an MTJ device as a magnetoresistive read head for magnetic recording has also been proposed, as described in U.S. Pat. No. 5,390,061. In this MTJ read head, the free and fixed ferromagnetic layers have lateral perimeters which do not extend beyond that of the lateral perimeter of the insulating tunnel barrier. In a magnetic recording device the read head senses flux from small magnetized regions or magnetic bits written into a thin film magnetic medium above which the head is suspended. Increased capacity disk drives are achieved in part by higher magnetic bit areal densities. Thus the area of each magnetic region or bit must be decreased but this thereby gives rise to reduced magnetic flux. Magnetic recording heads which can sense reduced magnetic flux with greater output signal are thereby required for higher performance and higher capacity magnetic recording disk drives. Improved magnetic recording read heads can be obtained by finding MTJ structures with higher magnetoresistance coefficients. However the MR coefficients are determined by the intrinsic electronic and magnetic properties of the materials comprising the MTJ.

What is needed is an MTJ MR read head for a magnetic recording system which gives greater output signal for the same input magnetic flux for otherwise the same set of magnetic and electrical materials from the which MTJ is constructed.

SUMMARY OF THE INVENTION

The invention is an MTJ MR read head for a magnetic recording system wherein the free ferromagnetic layer also acts as a rear flux guide to direct magnetic flux from the magnetic recording medium to the tunnel junction. In a magnetic recording disk drive embodiment, the fixed ferromagnetic layer, the tunnel barrier layer and free ferromagnetic layer all have their edges exposed at the air-bearing surface (ABS). Both the fixed and free ferromagnetic layers are in contact with opposite surfaces of the tunnel barrier layer but the free ferromagnetic layer extends beyond the back edge of either the tunnel barrier layer or the fixed ferromagnetic layer, whichever back edge is closer to the sensing surface. This assures that the magnetic flux is non-zero in the tunnel junction region. The magnetization direction of the fixed ferromagnetic layer is fixed in a direction generally perpendicular to the ABS and thus to the disk surface, preferably by interfacial exchange coupling with an antiferromagnetic layer. The magnetization direction of the free ferromagnetic layer is aligned in a direction generally parallel to the surface of the ABS in the absence of an applied magnetic field and is free to rotate in the presence of applied magnetic fields from the magnetic recording disk. A layer of high coercivity hard magnetic material adjacent the sides of the free ferromagnetic layer longitudinally biases the magnetization of the free ferromagnetic layer in the preferred direction.

The MTJ MR read head may be formed as part of an integrated read/write head structure in which there are electrically conducting magnetic shields located on both sides of the MTJ MR read head. The electrical leads for sensing circuitry are formed on the two shields so that an electrical path is provided from the shields through the leads to the fixed and free ferromagnetic layers of the tunnel junction.

For a fuller understanding of the nature and advantages of the present invention, reference should be made to the following detailed description taken together with the accompanying figures.

DETAILED DESCRIPTION OF THE INVENTION

Prior Art

Figure 1:
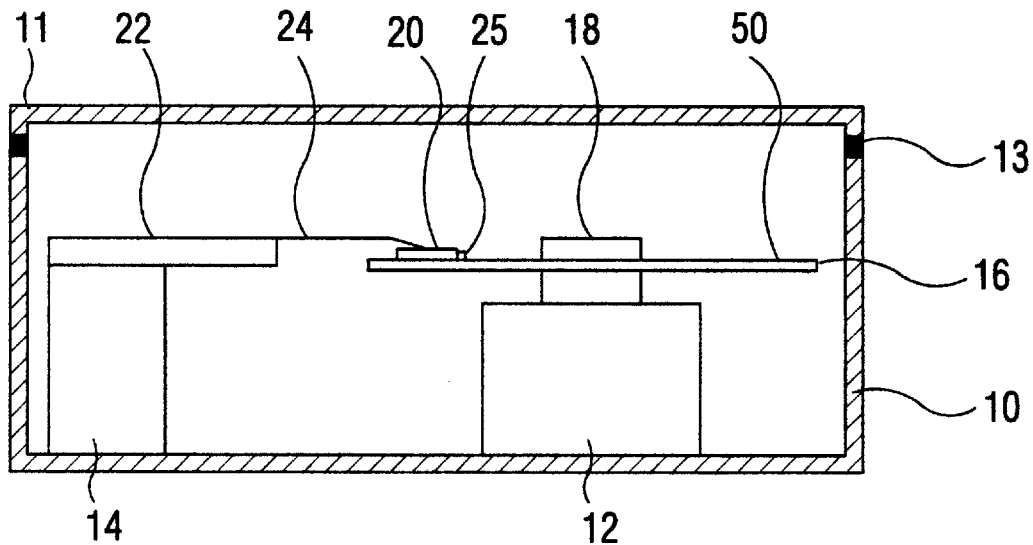
FIG. 1 is a simplified block diagram of a conventional magnetic recording disk drive for use with the recessed MTJ MR read head according to the present invention.

Referring first to FIG. 1, there is illustrated in sectional view a schematic of a prior art disk drive of the type using a MR sensor. The disk drive comprises a base 10 to which are secured a disk drive motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. A magnetic recording disk 16 is connected to drive motor 12 by means of hub 18 to which it is attached for rotation by the drive motor 12. A thin lubricant film 50 is maintained on the surface of disk 16. A read/write head or transducer 25 is formed on the trailing end of a carrier, such as an air-bearing slider 20. Transducer 25 is a read/write head comprising an inductive write head portion and a MR read head portion, as will be described with respect to FIG. 3. The slider 20 is connected to the actuator 14 by means of a rigid arm 22 and a suspension 24. The suspension 24 provides a biasing force which urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head 25 may access different data tracks on disk 16.

Figure 2:
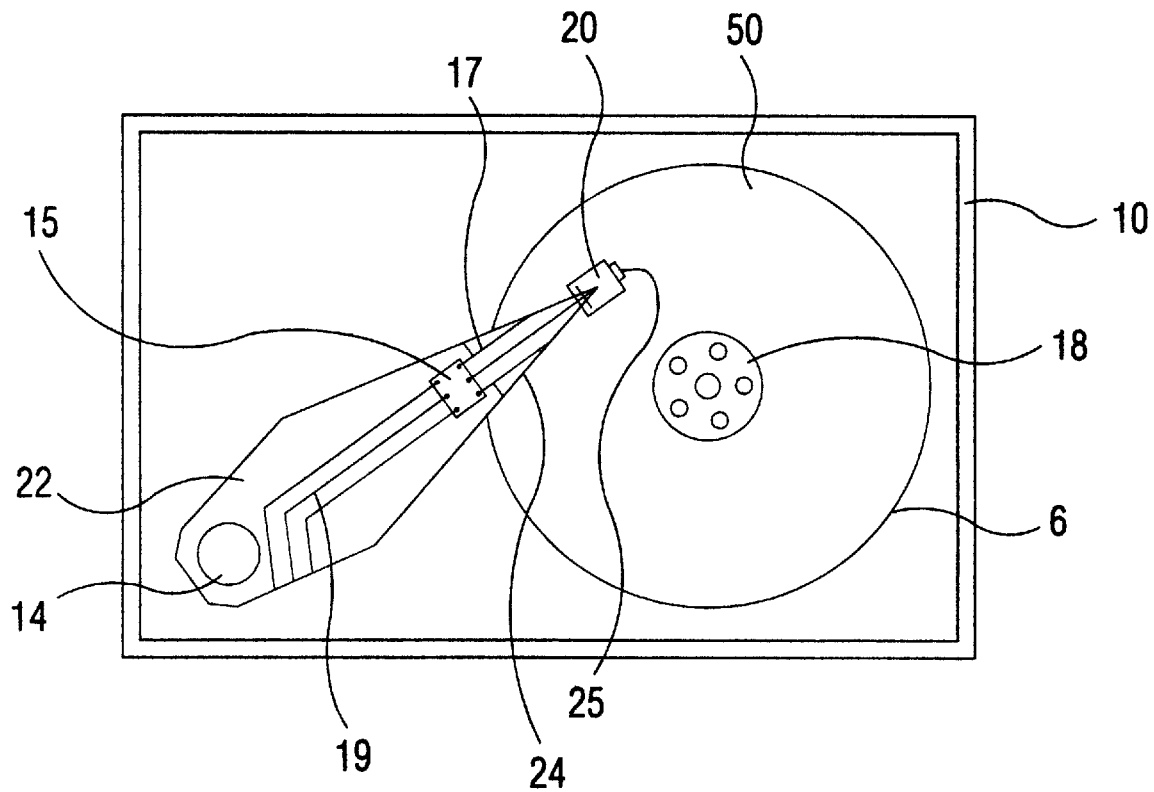
FIG. 2 is a top view of the disk drive of FIG. 1 with the cover removed.

FIG. 2 is a top view of the interior of the disk drive with the cover 11 removed, and illustrates in better detail the suspension 24 which provides a force to the slider 20 to urge it toward the disk 16. The suspension may be a conventional type of suspension, such as the well-known Watrous suspension, as described in IBM's U.S. Pat. No. 4,167,765. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals to the disk drive electronics (not shown) via cable 19.

Figure 3:
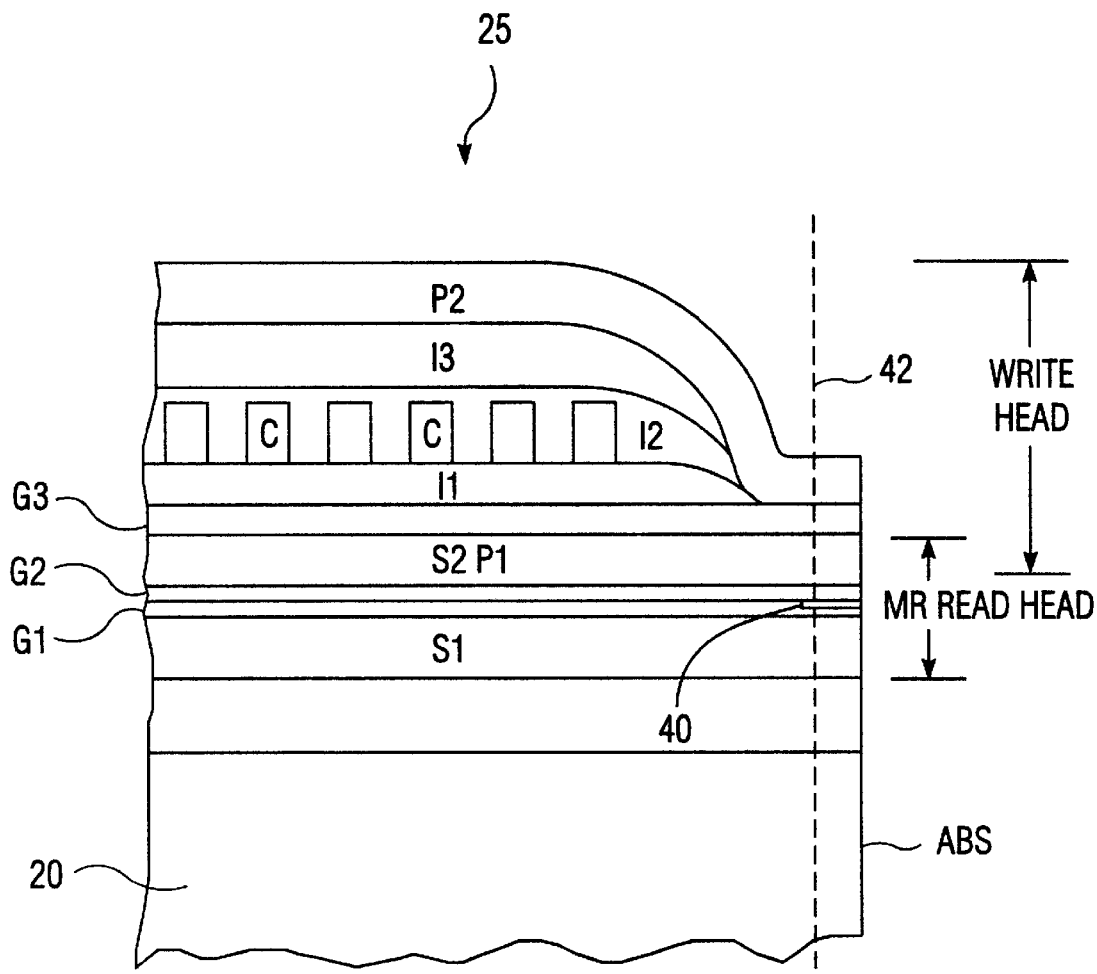
FIG. 3 is a vertical cross-section of a conventional integrated inductive write head/MR read head with the MR read head located between shields and adjacent to the inductive write head for the purpose of illustrating where the MTJ MR read head of the present invention would be located.

FIG. 3 is a cross-sectional schematic view of the integrated read/write head 25 which includes a MR read head portion and an inductive write head portion. The head 25 is lapped to form an air-bearing surface (ABS), the ABS being spaced from the surface of the rotating disk 16 (FIG. 1) by the air bearing as discussed above. The read head includes a MR sensor 40 sandwiched between first and second gap layers G1 and G2 which are, in turn, sandwiched between first and second magnetic shield layers S1 and S2. In a conventional disk drive, the MR sensor 40 is an AMR sensor. The write head includes a coil layer C and insulation layer I2 which are sandwiched between insulation layers I1 and I3 which are, in turn, sandwiched between first and second pole pieces P1 and P2. A gap layer G3 is sandwiched between the first and second pole pieces P1, P2 at their pole tips adjacent to the ABS for providing a magnetic gap. During writing, signal current is conducted through the coil layer C and flux is induced into the first and second pole layers P1, P2 causing flux to fringe across the pole tips at the ABS. This flux magnetizes circular tracks on the rotating disk 16 during a write operation. During a read operation, magnetized regions on the rotating disk 16 inject flux into the MR sensor 40 of the read head, causing resistance changes in the MR sensor 40. These resistance changes are detected by detecting voltage changes across the MR sensor 40. The voltage changes are processed by the chip 15 (FIG. 2) and drive electronics and converted into user data. The combined head 25 shown in FIG. 3 is a "merged" head in which the second shield layer S2 of the read head is employed as a first pole piece P1 for the write head. In a piggyback head (not shown), the second shield layer S2 and the first pole piece P1 are separate layers.

The above description of a typical magnetic recording disk drive with an AMR read head, and the accompanying FIGS. 1–3, are for representation purposes only. Disk drives may contain a large number of disks and actuators, and each actuator may support a number of sliders. In addition, instead of an air-bearing slider, the head carrier may be one which maintains the head in contact or near contact with the disk, such as in liquid bearing and other contact and near-contact recording disk drives.

PREFERRED EMBODIMENTS

The present invention is a MR read head with an MTJ sensor for use in place of the MR sensor 40 in the read/write head 25 of FIG. 3.

Figure 4:
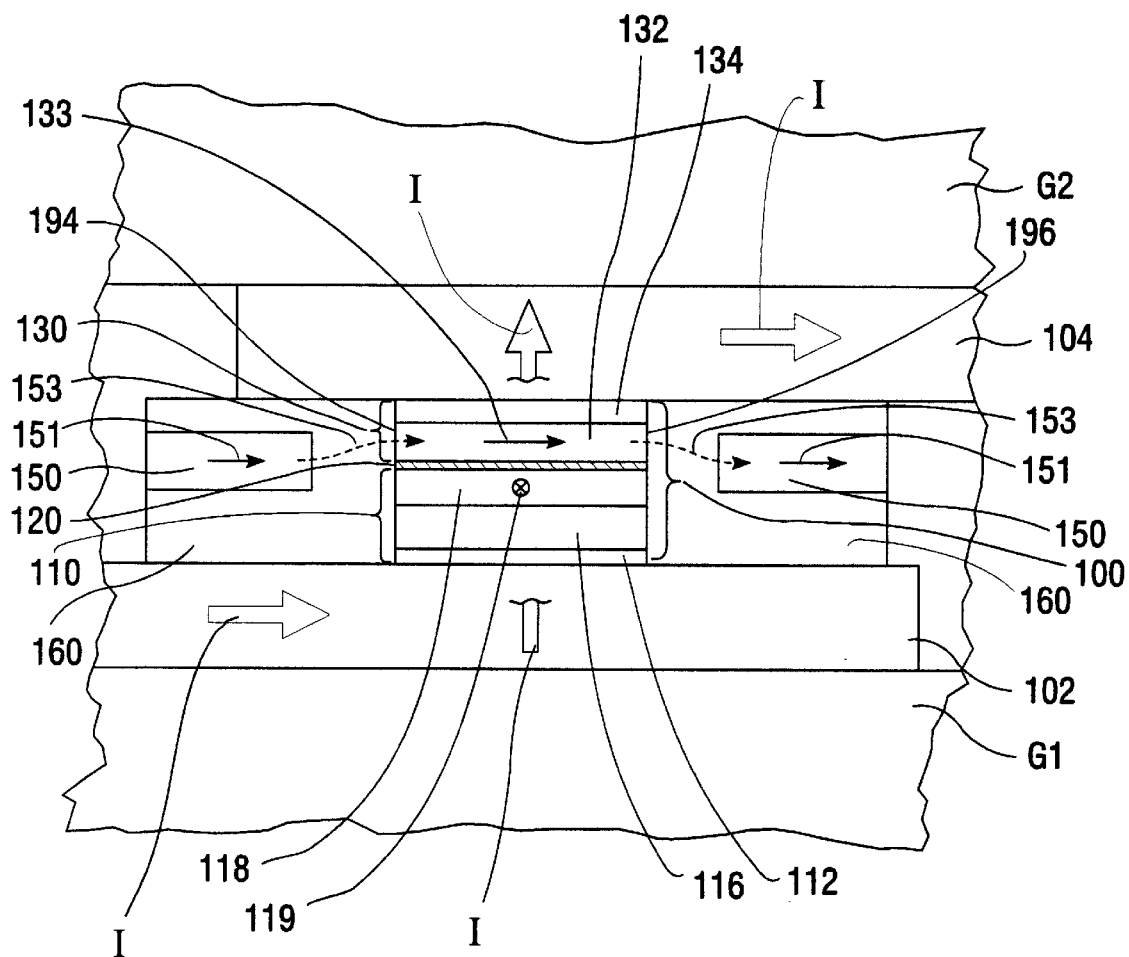
FIG. 4 is a cross-section view taken through the tunnel junction of the MTJ MR read head of the present invention and illustrates the perpendicular direction of current flow through the tunnel junction.

FIG. 4 is a section view of the MTJ MR read head of the present invention as it would appear if taken through a plane whose edge is shown as line 42 in FIG. 3 and viewed from the disk surface. Thus the paper of FIG. 4 is a plane parallel to the ABS and through substantially the active sensing region, i.e., the tunnel junction, of the MTJ MR read head to reveal the layers that make up the head.

Referring to FIG. 4, the MTJ MR read head includes an electrical lead 102 formed on the gap layer G1 substrate, an electrical lead 104 below gap layer G2, and the MTJ 100 formed as a stack of layers between electrical leads 102, 104.

The MTJ 100 includes a first electrode multilayer stack 110, an insulating tunnel barrier layer 120, and a top electrode stack 130. Each of the electrodes includes a ferromagnetic layer in direct contact with tunnel barrier layer 120, i.e., ferromagnetic layers 118 and 132.

The base electrode layer stack 110 formed on electrical lead 102 includes a seed or "template" layer 112 on the lead 102, a layer of antiferromagnetic material 116 on the template layer 112, and a "fixed" ferromagnetic layer 118 formed on and exchange coupled with the underlying antiferromagnetic layer 116. The ferromagnetic layer 118 is called the fixed layer because its magnetic moment or magnetization direction is prevented from rotation in the presence of applied magnetic fields in the desired range of interest. The top electrode stack 130 includes a "free" or "sensing" ferromagnetic layer 132 and a protective or capping layer 134 formed on the sensing layer 132. The sensing ferromagnetic layer 132 is not exchange coupled to an antiferromagnetic layer, and its magnetization direction is thus free to rotate in the presence of applied magnetic fields in the range of interest. The sensing ferromagnetic layer 132 is fabricated so as to have its magnetic moment or magnetization direction (shown by arrow 133) oriented generally parallel to the ABS (the ABS is a plane parallel to the paper in FIG. 4) and generally perpendicular to the magnetization direction of the fixed ferromagnetic layer 118 in the absence of an applied magnetic field. The fixed ferromagnetic layer 118 in electrode stack 110 just beneath the tunnel barrier layer 120 has its magnetization direction fixed by interfacial exchange coupling with the immediately underlying antiferromagnetic layer 116, which also forms part of bottom electrode stack 110. The magnetization direction of the fixed ferromagnetic layer 118 is oriented generally perpendicular to the ABS, i.e., out of or into the paper in FIG. 4 (as shown by arrow tail 119).

Also shown in FIG. 4 is a biasing ferromagnetic layer 150 for longitudinally biasing the magnetization of the sensing ferromagnetic layer 132, and an insulating layer 160 separating and isolating the biasing layer 150 from the sensing ferromagnetic layer 132 and the other layers of the MTJ 100. The biasing ferromagnetic layer 150 is a hard magnetic material, such as a CoPtCr alloy, that has its magnetic moment (shown by arrow 151) aligned in the same direction as the magnetic moment 133 of the sensing ferromagnetic layer 132 in the absence of an applied magnetic field. The insulating layer 160, which is preferably alumina ($Al_2O_3$) or silica ($SiO_2$), has a thickness sufficient to electrically isolate the biasing ferromagnetic layer 150 from the MTJ 100 and the electrical leads 102, 104, but is still thin enough to permit magnetostatic coupling (shown by dashed arrow 153) with the sensing ferromagnetic layer 132. The product M*t (where M is the magnetic moment per unit area of the material in the ferromagnetic layer and t is the thickness of the ferromagnetic layer) of the biasing ferromagnetic layer 150 must be greater than or equal to the M*t of the sensing ferromagnetic layer 132 to assure stable longitudinal biasing. Since the magnetic moment of $Ni_{(100-x)}$—$Fe_{(x)}$ (x being approximately 19) that is typically used in the sensing ferromagnetic layer 132 is about twice that of the magnetic moment of a typical hard magnetic material suitable for the biasing ferromagnetic layer 150, such as $Co_{75}Pt_{13}Cr_{12}$, the thickness of the biasing ferromagnetic layer 150 is at least approximately twice that of the sensing ferromagnetic layer 132.

A sense current I is directed from first electrical lead 102 perpendicularly through the antiferromagnetic layer 116, the fixed ferromagnetic layer 118, the tunnel barrier layer 120, and the sensing ferromagnetic layer 132 and then out through the second electrical lead 104. As described previously, the amount of tunneling current through the tunnel barrier layer 120 is a function of the relative orientations of the magnetizations of the fixed and sensing ferromagnetic layers 118, 132 that are adjacent to and in contact with the tunnel barrier layer 120. The magnetic field from the recorded data causes the magnetization direction of sensing ferromagnetic layer 132 to rotate away from the direction 133, i.e., either into or out of the paper of FIG. 4. This changes the relative orientation of the magnetic moments of the ferromagnetic layers 118, 132 and thus the amount of tunneling current, which is reflected as a change in electrical resistance of the MTJ 100. This change in resistance is detected by the disk drive electronics and processed into data read back from the disk. The sense current is prevented from reaching the biasing ferromagnetic layer 150 by the electrical insulating layer 160, which also insulates the biasing ferromagnetic layer 150 from the electrical leads 102, 104.

A representative set of materials for MTJ 100 (FIG. 4) will now be described. All of the layers of the MTJ 100 are grown in the presence of a magnetic field applied parallel to the surface of the substrate. The magnetic field serves to orient the easy axis of all of the ferromagnetic layers. A 5 nm Ta seed layer (not shown) is first formed on a 10–50 nm Au layer that serves as the electrical lead 102. The seed layer is comprised of a material which encourages the (111) growth of the face-centered cubic (fcc) $Ni_{81}Fe_{19}$ template layer 112. The template ferromagnetic layer 112 encourages the growth of the antiferromagnetic layer 116. Suitable seed layer materials include fcc metals, such as Cu, as well as Ta or a combination of layers, such as 3–5 nm Ta/3–5 nm Cu. The MTJ base electrode stack 110 comprises a stack of 4 nm $Ni_{81}Fe_{19}$/10 nm $Fe_{50}Mn_{50}$/8 nm $Ni_{81}Fe_{19}$ (layers 112, 116, 118, respectively) grown on the Ta seed layer on the 10–20 nm Au layer 102. The Au lead layer 102 is formed on the alumina gap material G1 that serves as the substrate. Next, the tunnel barrier layer 120 is formed by depositing and then plasma oxidizing a 0.5–2 nm Al layer. This creates the $Al_2O_3$ insulating tunnel barrier layer 120. The top electrode stack 130 is a 5 nm Ni—Fe/10 nm Ta stack (layers 132, 134, respectively). The Ta layer 134 serves as a protective capping layer. The top electrode stack 130 is contacted by a 20 nm Au layer that serves as the electrical lead 104.

Note that since the current passes perpendicular to the layers in MTJ 100, the resistance of the MTJ device will be largely dominated by that of the tunnel barrier layer 120. Thus, the resistance per unit area of the conducting leads 102, 104 can be much higher than in conventional MR read heads in which the current flows parallel to the layers. Thus, the leads 102, 104 can be made thinner and/or narrower than in conventional MR head structures, and/or can be made from intrinsically more resistive materials, such as alloys or combinations of elements.

It is important that the layers in the bottom electrode stack 110 be smooth, and that the $Al_2O_3$ tunnel barrier layer 120 be free of pinholes which would electrically short the junction. For example, growth by sputtering techniques known to produce good giant magnetoresistance effects in metallic multilayer stacks is sufficient.

An alternative sensing ferromagnetic layer 132 may be comprised of a thin Co or $Co_{(100-x)}Fe_{(x)}$ or $Ni_{(100-x)}Fe_x$ (x is approximately 60) layer at the interface between the sensing ferromagnetic layer 132 and the tunnel barrier layer 120, with the bulk of layer 132 being a low magnetostriction material, such as $Ni_{(100-x)}Fe_x$ (x is approximately 19). The net magnetostriction of this type of sensing layer with a thin Co or $Co_{(100-x)}Fe_{(x)}$ or $Ni_{(100-x)}Fe_x$ (x is approximately 60) interface layer is arranged to have a value close to zero by slight variations of the composition of the bulk of layer 132. An alternative fixed ferromagnetic layer 118 may be comprised largely of a bulk $Ni_{(100-x)}Fe_{(x)}$ layer with a thin layer of a Co or $Co_{(100-x)}Fe_{(x)}$ or $Ni_{(100-x)}Fe_x$ (x is approximately 60) layer at the interface with the tunnel barrier layer 120. The largest signal is obtained with Co or with the highest polarization $Ni_{(100-x)}Fe_x$ (x is approximately 60) or $Co_{(100-x)}Fe_{(x)}$ alloy (x is approximately 70). The interface layer is optimally about 1–2 nm thick. The net magnetostriction of the combined layer is arranged to be close to zero by small variations of the composition. If the bulk of layer 118 is Ni—Fe, then the composition is $Ni_{81}Fe_{19}$, the composition for which bulk Ni—Fe has zero magnetostriction.

The Fe—Mn antiferromagnetic layer 116 may be replaced with a Ni—Mn layer or other suitable antiferromagnetic layer which exchange biases the ferromagnetic material in the fixed layer 118 and which has a resistance which is substantially less than that of the $Al_2O_3$ barrier layer 120. In addition, while in the preferred embodiment the fixed ferromagnetic layer has its magnetic moment fixed by interfacial exchange coupling with an antiferromagnetic layer, the fixed ferromagnetic layer may be formed of a magnetically "hard" high coercivity material, thereby avoiding the need for an antiferromagnetic layer. The hard fixed ferromagnetic layer may thus be formed from a variety of ferromagnetic materials, such as alloys of Co and one or more other elements, including Co—Pt—Cr alloys, Co—Cr—Ta alloys, Co—Cr alloys, Co—Sm alloys, Co—Re alloys, Co—Ru alloys, and Co—Ni—X alloys (X=Pt, Pd, or Cr), as well as a variety of quaternary alloys, such as Co—Ni—Cr—Pt and Co—Pt—Cr—B.

While the MTJ device described and shown in FIG. 4 has the fixed ferromagnetic layer on the bottom of MTJ 100, the device can also be formed by depositing the sensing ferromagnetic layer first, followed by the tunnel barrier layer, the fixed ferromagnetic layer, and the antiferromagnetic layer. Such an MTJ device would then have the layers essentially inverted from the MTJ 100 shown in FIG. 4.

Figure 5:
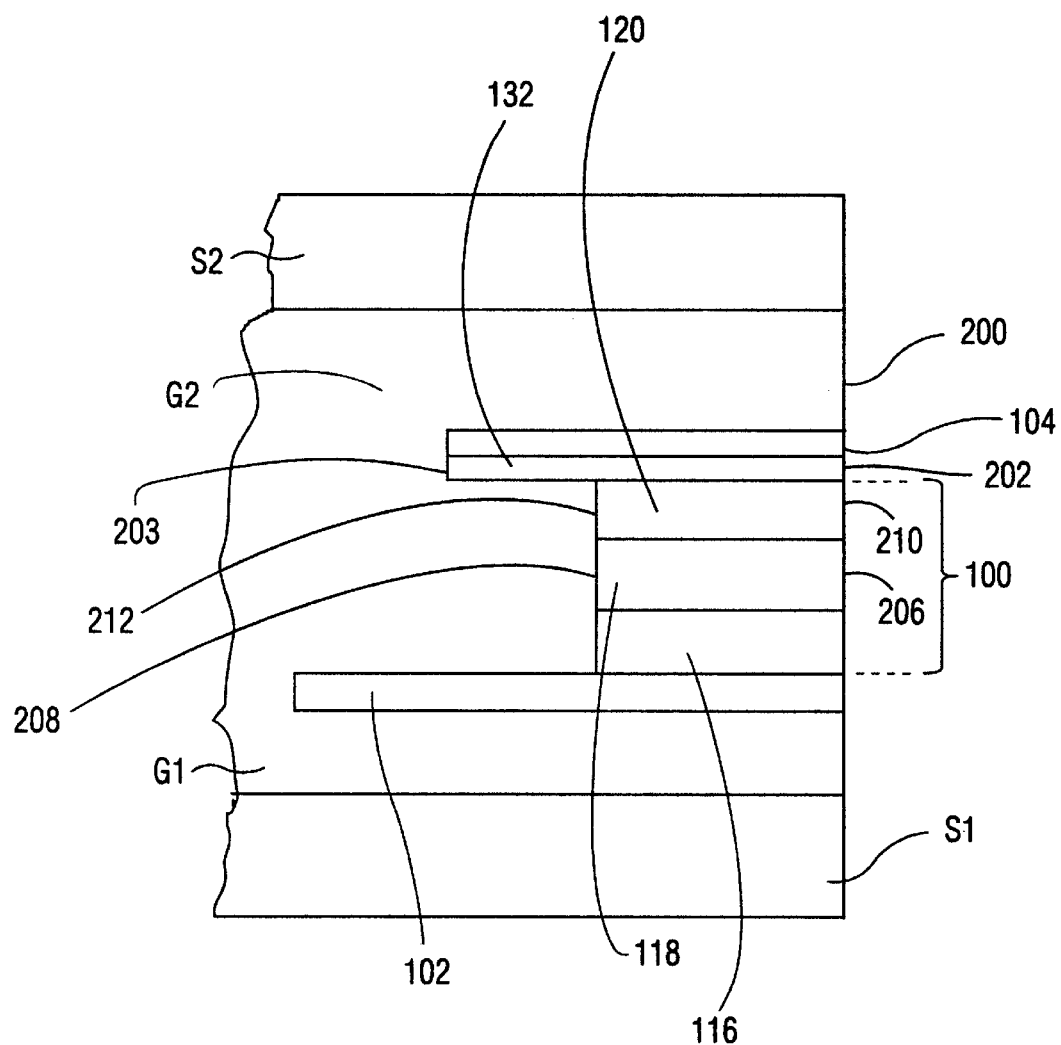
FIG. 5 is a sectional view of the rear flux guided MTJ MR read head illustrating the location of the various layers relative to sensing end of the head (the air-bearing surface).

Referring now to FIG. 5, the rear flux guided MTJ MR head of the present invention is illustrated in a section view perpendicular to the view of FIG. 4 and with the sensing surface 200 or ABS to the right. For ease of explanation, the biasing ferromagnetic layer 150 is not shown and in the MTJ 100 only the ferromagnetic layers, the antiferromagnetic layer and the tunnel barrier layer are shown. The sensing ferromagnetic layer 132 has a sensing edge 202 that is substantially coplanar with the sensing surface 200 or ABS and a back edge 203. The fixed ferromagnetic layer 118 has a front edge 206 that is substantially coplanar with the sensing surface 200 or ABS and a back edge 208. The antiferromagnetic layer 116 has edges contiguous with the edges of the fixed ferromagnetic layer 118. The tunnel barrier layer 120 has a front edge 210 that is also substantially coplanar with the sensing surface 200 or ABS and which is essentially coplanar with front edge 206 of the fixed ferromagnetic layer 118, and a back edge 212. The back edge of the sensing ferromagnetic layer 203 extends beyond the back edge of either the tunnel barrier layer 212 or the fixed ferromagnetic layer 208, whichever back edge is closer to the sensing surface 200. The lead 102 is formed on the G1 gap layer and the G2 gap layer separates the lead 104 from magnetic shield S2. The material of G1 and G2 and in the region behind back edges 203, 208 and 212 is an electrically insulating material, preferably alumina. The sensing surface 200 or ABS may have a protective overcoat formed on it, such as a thin layer of amorphous diamond-like carbon, as is known in the art to protect the head during contact with the disk.

As shown in FIG. 3 a MR sensor, such as sensor 40, is placed between permeable magnetic shields S1 and S2. When the MTJ read head is located in this region, as shown in FIG. 5, the magnetic flux to be detected enters the front edge 202 of the free ferromagnetic layer 132 at the air-bearing surface 200 and decays towards the read edge 203 of this layer. The flux is constrained to be zero at the rear edge 203 of this layer. Some of the incident magnetic flux leaks to the magnetic shields S1 and S2. This leakage is determined by the shield—shield gap width g, and the permeability $\mu$ and thickness t of the free ferromagnetic layer 132. The magnetic flux thus decays from the front edge of the free ferromagnetic layer with a characteristic length $\lambda$ of $(\mu t g/2)^{0.5}$. Typical parameters for a 5 Gbit/$in^2$ sensor are g=200 nm, t=5 nm and $\mu$=1000. This results in a decay length $\lambda$ of 0.7 micron.

In the earlier U.S. Pat. No. 5,390,061 describing the use of an MTJ device for a magnetic recording read head the rear edge of the free ferromagnetic layer was contiguous with that of the fixed ferromagnetic layer or closer to the ABS than the rear edge of the fixed ferromagnetic layer. Thus for high density recording applications in which the height of the sensor is comparable to or less than $\lambda$ (for example, for a 5 Gbit/$in^2$ sensor the sensor height is 400 nm) the magnetic flux is constrained to be zero in the active region of the sensor (the region between the ABS 200 and the rear edge 212 of the tunnel barrier layer 120 or the rear edge 208 of the fixed ferromagnetic layer 118, whichever edge is closest to the ABS 200). By extending the free ferromagnetic layer 132 beyond the active region of the sensor by the addition of a flux guide at the rear edge of the free ferromagnetic layer then the flux is constrained to be zero only at the rear edge of the rear flux guide. Thus the amount of magnetic flux in the active region of the sensor is increased beyond that in the absence of such a rear flux guide. Consequently, the output signal of the MTJ sensor with the rear flux guide is enhanced by the amount of extra flux in the active region of the sensor.

Because current flows perpendicular to the tunnel junction and thus to the portion of the flux guide that forms part of the tunnel junction, no current is shunted away by the portion of the free ferromagnetic layer that extends beyond the tunnel junction. While in the preferred embodiment of FIG. 5 the back edges 212, 208 of the tunnel barrier layer 120 and the fixed ferromagnetic layer 118, respectively, are coplanar, they need not be so, provided the back edge 203 of the free ferromagnetic layer 132 is farther from the sensing surface 200 than whichever of back edges 212, 208 is closer to the sensing surface 200. This is because the current flow perpendicular through the tunnel barrier layer 120 is defined by whichever back edge 212, 208 is closer to the sensing surface 200. Thus the back edge 203 of the sensing ferromagnetic layer 132 is located farther than the back edge 212 of the tunnel barrier layer 120 if the back edge 212 is closer to the sensing surface 200 than the back edge 208 of the fixed ferromagnetic layer 118. Similarly, the back edge 203 of the sensing ferromagnetic layer 132 is located farther than the back edge 208 of the fixed ferromagnetic layer 118 if the back edge 208 is closer to the sensing surface 200 than the back edge 212 of the tunnel barrier layer 120.

While in the preferred embodiment shown and described with respect to FIG. 5 the first lead 102 is shown as having its back edge extending beyond the back edges of the antiferromagnetic layer 116 and fixed ferromagnetic layer 118, the first lead 102 may have its back edge substantially coplanar with the back edges of the antiferromagnetic layer 116 and fixed ferromagnetic layer 118. Also while the second lead 104 is shown as having its back edge coplanar with the back edge 203 of the free ferromagnetic layer 132, the second lead 104 may have its back edge extending beyond the back edge 203 of the free ferromagnetic layer 132. Similarly the second lead 104 may have its back edge closer to the ABS 200 than the back edge 203 of the free ferromagnetic layer 132 providing that its back edge is further from the ABS 200 than the rear edge of the active region of the sensor.

In an alternative embodiment the substrate onto which the first lead 102 is formed is the first magnetic shield S1 and the second magnetic shield S2 is formed on the second lead 104. The shields S1 and S2 are formed of Ni—Fe alloys or Ni—Fe—Co alloys and are electrically conducting. In this embodiment an electrically conductive path is thus provided through the shield S1 to first lead 102, perpendicularly through the tunnel junction to the second lead 104 and the second shield S2. This embodiment eliminates the need for insulative gap layers G1, G2, although insulative material is still required at the back of the tunnel junction, as shown in FIG. 5.

Process for Fabricating the Recessed MTJ MR Read Head

For AMR or spin valve sensors where the sense current flows parallel to the layers of the sensor, adjoining the flux guide to the sensor is difficult since the flux guide and the sensor must be electrically isolated so as not to shunt the current from the sensor. Yet the flux guide and the sensor must be magnetically coupled. This can be accomplished by insulating the sensor with a dielectric layer and then aligning a flux guide shape to the sensor. Efficient magnetic coupling to the sensor requires alignments of 0.1 μm accuracy and dielectric thicknesses of 5 nm to 10 nm, both of which are difficult to accomplish with present day technologies used for MR head fabrication. However, if a magnetic tunnel junction sensor is used, where current flows perpendicularly to the layers of the sensor, then the flux guide need not be electrically isolated from the sensing layer. The rear flux guide can be a continuous extension of the free ferromagnetic layer, as illustrated in the preferred embodiment in FIG. 5.

Referring to FIG. 6, the process for forming the rear flux guided MTJ MR read head will be described. Two lithographic patterning steps are required. One defines the back edge of the fixed ferromagnetic layer 118 and one defines the back edge of the free ferromagnetic layer 132. The MTJ MR read head is fabricated on a layer of insulator, typically the alumina G1 layer, as shown in FIG. 5, but can also be fabricated directly on the bottom magnetic shield layer S1.

Figure 6A:
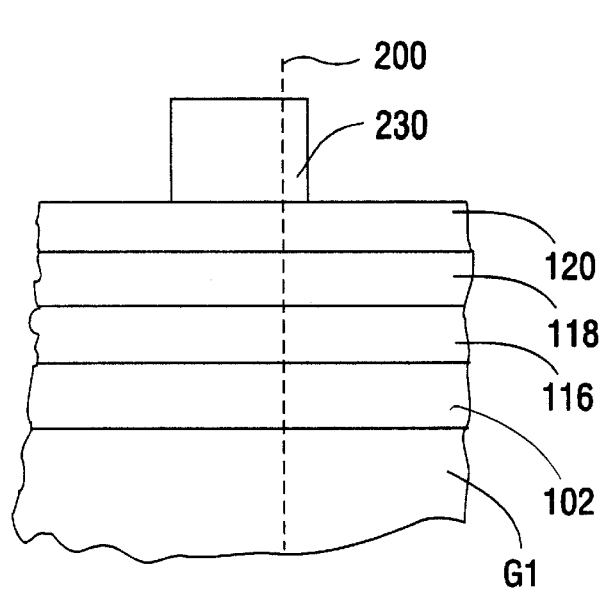
FIGS. 6A–6N illustrate steps in the fabrication of the rear flux guided MTJ MR read head of the present invention.

The process begins, as shown in FIG. 6A, by depositing the material for lead layer 102, an antiferromagnetic layer 116, the fixed ferromagnetic layer 118, and a material, such as aluminum, that will ultimately be oxidized to form the tunnel barrier layer 120. The lead material can be a variety of conducting materials, such as Ta, Al, Cu, Au, W and Pt with a typical thickness in the range of 100 to 500 Å. The antiferromagnetic layer 116 can be selected from a variety of well-known materials, such as Fe—Mn, Ni—Mn, Pt—Mn, Ir—Mn, Pd—Mn and Cr—Al. The typical thickness for the antiferromagnetic layer 116 is in the range of 70 to 300 Å. The fixed ferromagnetic layer 118 is preferably a Ni—Fe alloy or a bilayer of Ni—Fe alloy and a thin film of Co. Typical thicknesses for the Ni—Fe alloy layer are 20 to 100 Å and typical thicknesses for the Co layer are 2 to 20 Å. The thickness of the aluminum for the tunnel barrier oxide layer 120 is typically in the range of 5 to 20 Å.

Figure 6B:
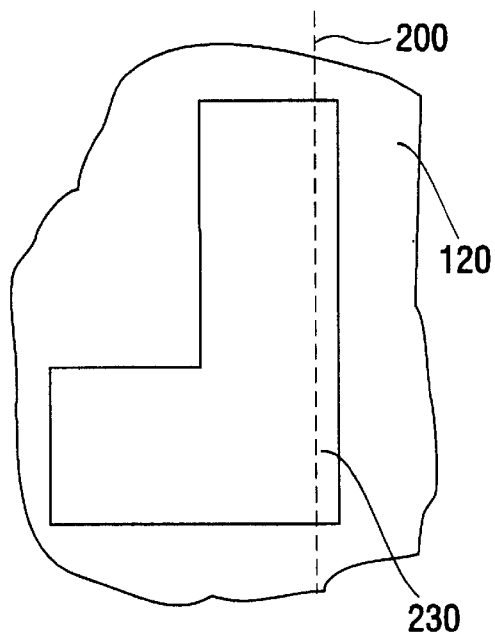
Figure 6C:
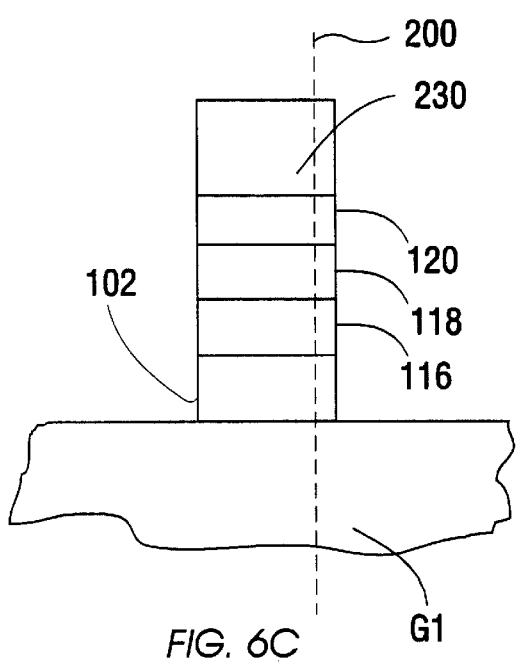
Figure 6D:
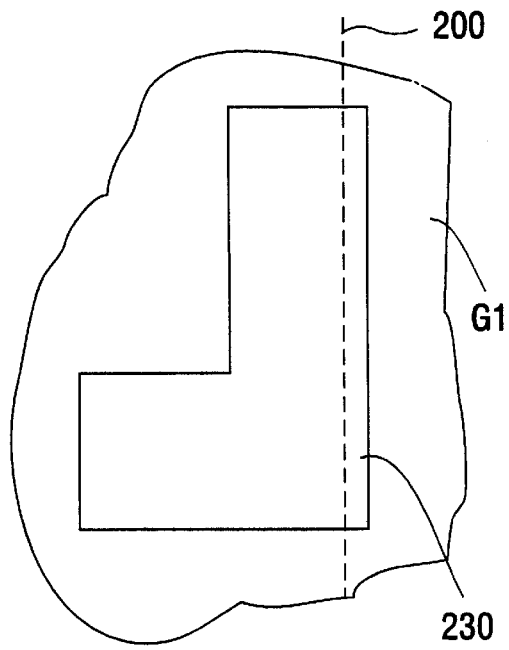

After deposition of these layers, which is usually either by ion beam deposition or rf or dc magnetron sputtering, the layers are patterned using resist 230 to define the desired shape shown in FIG. 6B, which is a top view of FIG. 6A. Ion milling then removes material not protected by resist 230, as shown in FIG. 6C. The lead layer 102, antiferromagnetic layer 116, fixed ferromagnetic layer 118 and tunnel barrier layer are now formed on layer G1 with the shape shown in FIG. 6D. The resist layer 230 is typically a bilayer resist with an undercut. After the ion milling step of FIG. 6C a layer of insulator 232, typically alumina or $SiO_2$, is deposited by ion beam or RF sputtering to seal the edges of the pattern, after which the resist layer 230 is lifted off, resulting in the structure shown in FIGS. 6E–6F. In this first lithographic patterning step the rear edge 208 of the fixed ferromagnetic layer 118 is set as a reference point.

Figures 6E, 6F:
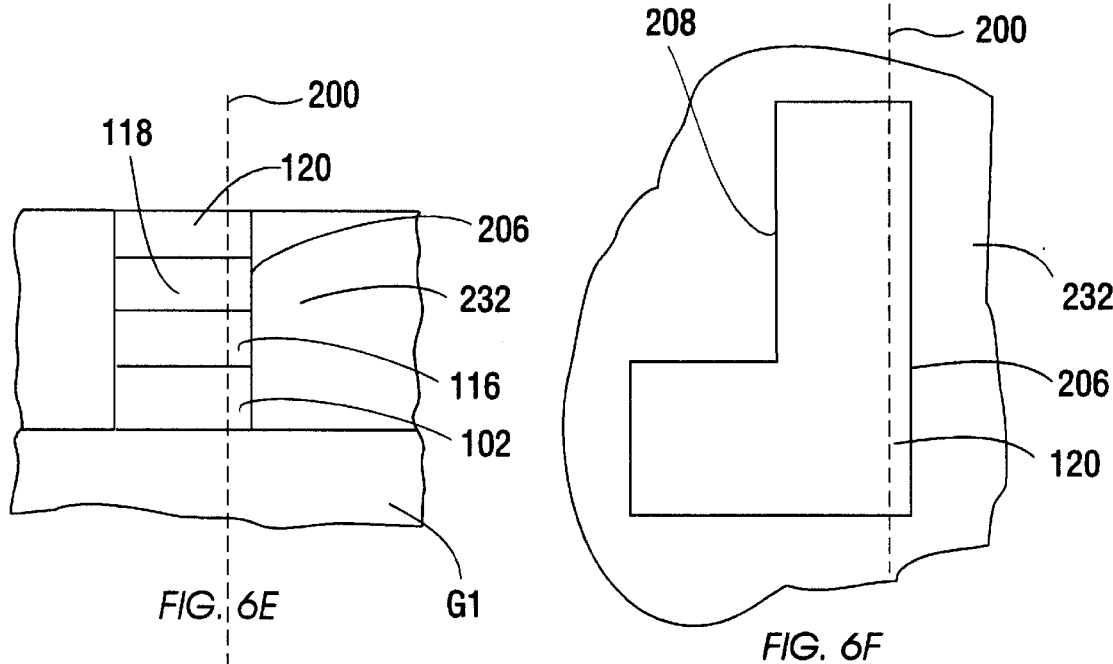

After patterning to form the structure of FIGS. 6E–6F, the aluminum in what will become the tunnel barrier layer 120 is plasma oxidized at an oxygen pressure of 100 mTorr and a power density of 25 W/cm$^2$ for 30–240 seconds. This forms the insulating tunnel barrier layer 120 of alumina.

Figures 6G, 6H:
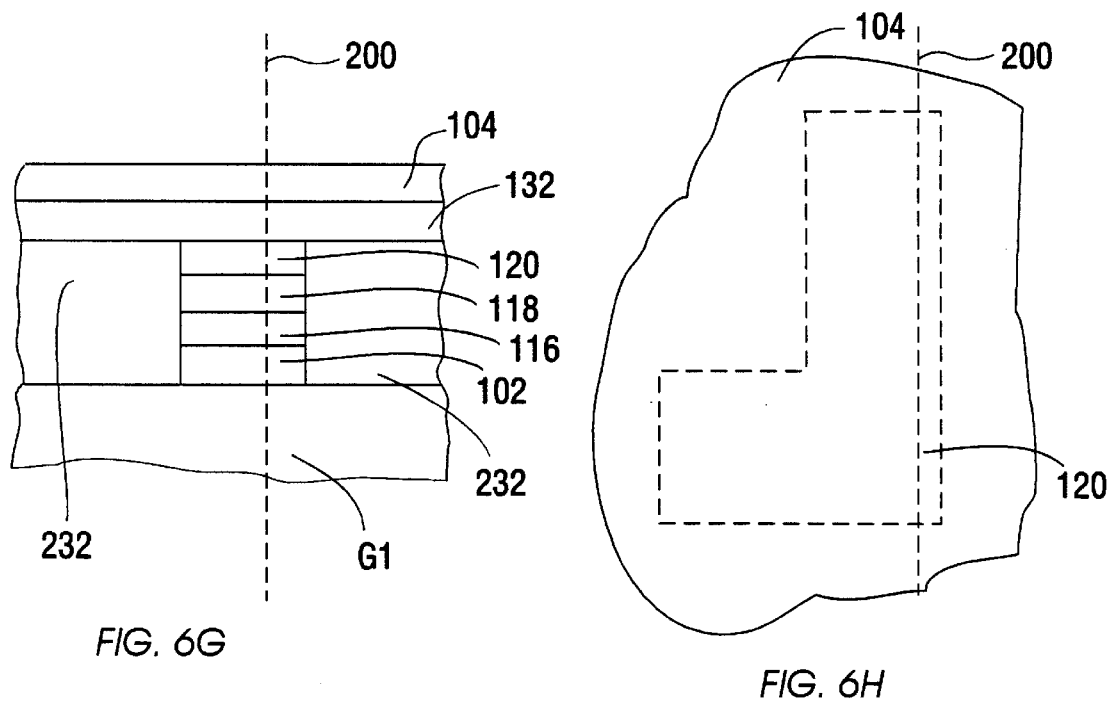

Next, as shown in FIGS. 6G–6H, the free ferromagnetic layer 132 and the lead layer 104 are deposited. The free ferromagnetic layer 132 is typically a Ni—Fe alloy or a bilayer of Co and a Ni—Fe alloy, with a thickness from 10 to 200 Å for the Ni—Fe alloy and a thickness of 2 to 20 Å for the Co. The lead 104 is formed of similar materials and thicknesses as described for the lead 102.

Figure 6J:
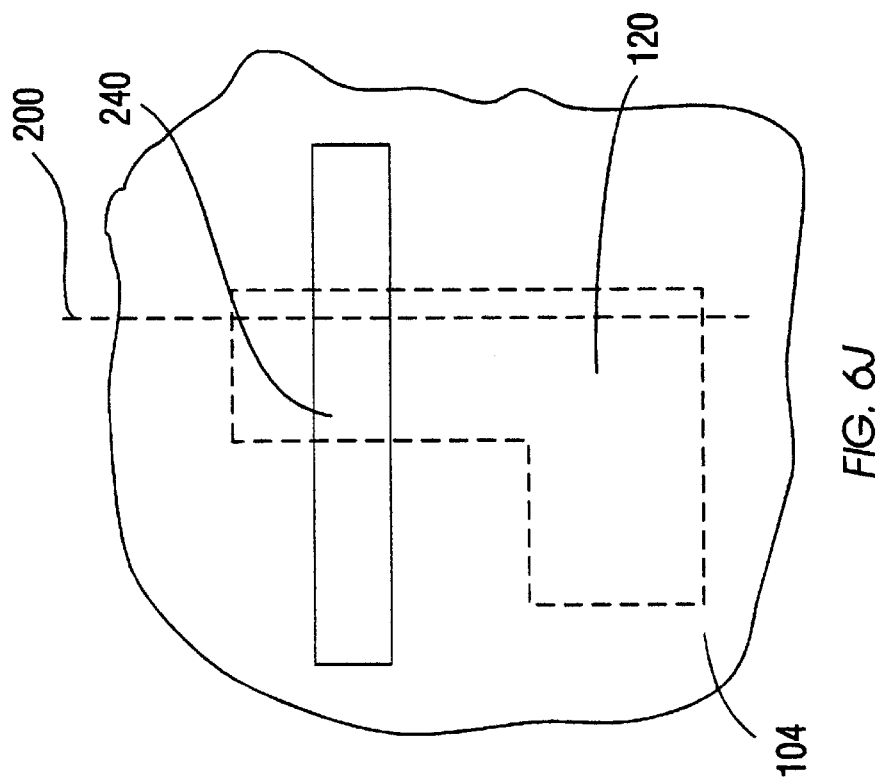
Figure 6I:
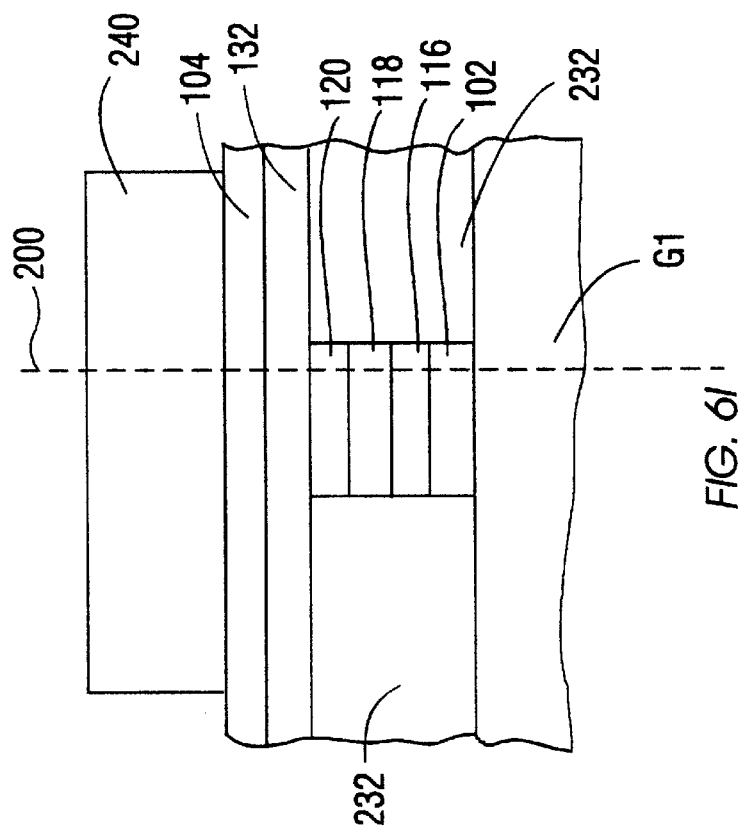
Figure 6L:
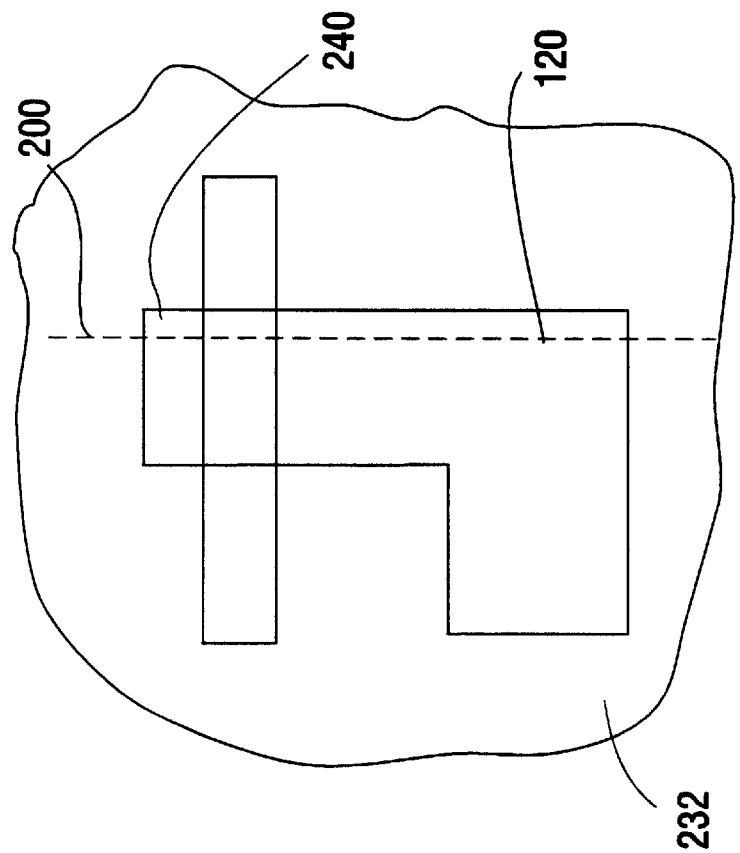
Figure 6K:
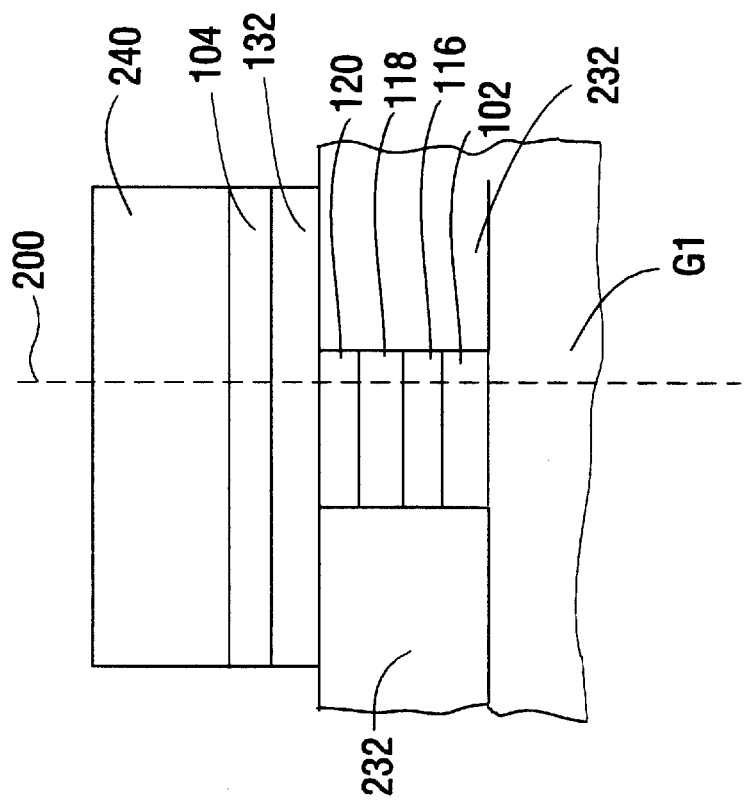

After deposition of layers 132, 104, which are done by either ion beam deposition or RF or dc magnetron sputtering, the free ferromagnetic layer 132 and lead layer 104 are patterned using resist 240 to define the desired shape, as shown in FIGS. 6I–6J. The resist layer 240 is typically a bilayer resist with an undercut. Ion milling then removes material not protected by resist 240, as shown in FIGS. 6K–6L. After the ion milling step of FIG. 6K a layer of insulator 242, typically alumina or $SiO_2$, is deposited by ion beam or RF sputtering to seal the edges of the pattern, after which the resist layer 240 is lifted off, resulting in the structure shown in FIGS. 6M–6N. An important feature defined in this second lithographic patterning is the width of the free ferromagnetic layer 132, i.e., the width w that will be exposed at the ABS. This step also defines the back edge 203 so that the free ferromagnetic layer 132 extends from the ABS and over the front edge 210 and back edge 212 of the tunnel barrier layer 120 and terminates beyond the back edge 212. As described previously, this assists in propagating flux efficiently across the entire active tunnel junction area defined by the back edges of the tunnel barrier layer 120 and fixed ferromagnetic layer 118 and the ABS 200.

Figure 7:
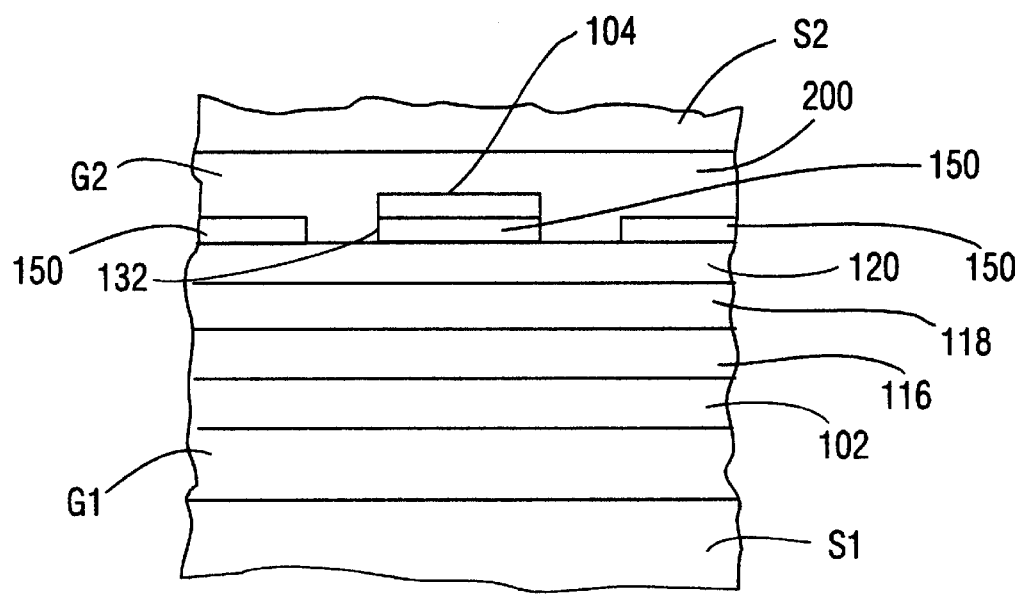
FIG. 7 is a view of the sensing surface illustrating the front edge of the MTJ device and the edges of the longitudinal biasing ferromagnetic layers.

The above process can also be adapted to provide longitudinal biasing or stabilization for the free ferromagnetic layer 132 that also serves as the flux guide, as described previously with respect to the biasing ferromagnetic layer 150 shown in FIG. 4. Specifically, the steps shown in FIGS. 6K–N are modified so that instead of depositing the alumina layer 242 and then lifting off the resist 240, a sequential deposition of alumina, hard biasing ferromagnetic material, and additional alumina is performed and then liftoff is done. The resulting structure is shown in FIG. 7, which is a view of sensing surface 200. FIG. 7 shows the sensing ferromagnetic layer 132 and second lead 104 with their front edges exposed at the sensing surface 200. Also shown are the exposed edges of the biasing ferromagnetic layers 150. The regions between the hard biasing ferromagnetic layers 150 and the sensing ferromagnetic layer 132, the first lead 102 and second lead 104 are formed of insulative material, such as alumina. The typical alumina thicknesses are in the 100 to 500 Å range and the hard biasing ferromagnetic material is usually a Co—Pt alloy with a thickness adjusted to provide 1 to 3 times the moment of the free ferromagnetic layer 132. The first alumina insulation covers the edges of the sensing ferromagnetic shape and the second alumina insulation covers the top surface of the hard biasing ferromagnetic material. After the liftoff, a final patterning step is used to remove unwanted regions of hard biasing ferromagnetic material.

The total thickness of the leads, free and fixed ferromagnetic layer, tunnel oxide layer, and antiferromagnetic layer are limited by the total separation between the shields S1 and S2. For a 5 Gbit/in$^2$ sensor this number ranges from 1000 to 2000 Å. It is advantageous to have the free ferromagnetic layer 132 centered in this gap between the two shields. This can be accomplished by adjusting the ratio of thicknesses of the leads 104, 102.

After the lead 104 and free ferromagnetic layer 132 have been patterned and the MTJ MR head structure is essentially complete but for the lapping step to form the ABS 200, it is still necessary to align the magnetization direction (magnetic moment) of the fixed ferromagnetic layer 118 in the proper direction. If Fe—Mn is used as the antiferromagnetic layer 116 for exchange coupling with the fixed ferromagnetic layer 118 it is antiferromagnetic as deposited. However, its magnetization must be realigned so that it can exchange couple the fixed ferromagnetic layer 118 in the proper orientation. The structure is placed in an annealing oven and the temperature is raised to approximately 180° C., which is greater than the blocking temperature of Fe—Mn. At this temperature, the Fe—Mn layer no longer gives rise to an exchange anisotropy with the fixed ferromagnetic layer 118. An exchange anisotropy of the ferromagnetic layer 118 is developed by cooling the pair of layers 116, 118 in a magnetic field. The orientation of the magnetization of the fixed ferromagnetic layer 118 will be along the direction of the applied magnetic field. The applied magnetic field in the annealing oven thus causes the moment of the fixed ferromagnetic layer 118 to be fixed along the required direction perpendicular to the ABS, as shown by the arrow 119 in FIG. 4. This is a result of cooling the Fe—Mn layer in the presence of the ferromagnetic layer 118, magnetized by the applied magnetic field, in the required direction. Thus, at temperatures below the blocking temperature of Fe—Mn, in the presence of an applied magnetic field from the recorded medium, the magnetization of the fixed ferromagnetic layer 118 will not substantially rotate.

As an alternative structure to the preferred embodiment shown in FIG. 5, the lead 104 and the free ferromagnetic layer 132 can be formed first on the G1 substrate, with the fixed ferromagnetic layer 118, antiferromagnetic layer 116 and lead 102 being on the "top" of the MTJ during the fabrication process.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic tunnel junction magnetoresistive read head for sensing data magnetically recorded on a medium when connected to sense circuitry, the head having a substantially planar sensing surface that is aligned generally parallel to the surface of the medium when the magnetically recorded data is being sensed, the head comprising:

a substrate having an edge forming part of the sensing surface;

a first electrically conductive lead formed on the substrate;

a fixed ferromagnetic layer formed on the first lead and having a front edge substantially coplanar with the sensing surface and a back edge located farther than the front edge from the sensing surface, the magnetization direction of the fixed ferromagnetic layer being fixed along a preferred direction so as to be substantially prevented from rotation in the presence of an applied magnetic field from the medium;

a sensing ferromagnetic layer having a sensing edge substantially coplanar with the sensing surface and a back edge, the magnetization direction of the sensing ferromagnetic layer being oriented in a direction generally perpendicular to the magnetization direction of the fixed ferromagnetic layer in the absence of an applied magnetic field and being free to rotate in the presence of an applied magnetic field from the medium;

an insulating tunnel barrier layer located between and in contact with the fixed and sensing ferromagnetic layers for permitting tunneling current in a direction generally perpendicular to the fixed and sensing ferromagnetic layers, the tunnel barrier layer having a front edge substantially coplanar with the sensing surface and a back edge, the back edge being located farther than the front edge from the sensing surface;

a second electrically conductive lead formed on the sensing ferromagnetic layer; and wherein the back edge of the sensing ferromagnetic layer is located farther than the back edge of the tunnel barrier layer from the sensing surface if the back edge of the tunnel barrier layer is closer to the sensing surface than the back edge of the fixed ferromagnetic layer, and farther from the sensing surface than the back edge of the fixed ferromagnetic layer if the back edge of the fixed ferromagnetic layer is closer to the sensing surface than the back edge of the tunnel barrier layer.

2. The head according to claim 1 wherein the front edge of the tunnel barrier layer and the front edge of the fixed ferromagnetic layer are substantially coplanar.

3. The head according to claim 1 wherein the back edge of the tunnel barrier layer and the back edge of the fixed ferromagnetic layer are substantially coplanar and wherein the back edge of the sensing ferromagnetic layer is located farther than the coplanar back edges of the tunnel barrier layer and fixed ferromagnetic layer from the sensing surface.

4. The head according to claim 1 further comprising an antiferromagnetic layer in contact with the fixed ferromagnetic layer for fixing the magnetization direction of the fixed ferromagnetic layer by interfacial exchange coupling, the antiferromagnetic layer having a front edge substantially coplanar with the sensing surface.

5. The head according to claim 1 wherein the back edges of the antiferromagnetic layer, the fixed ferromagnetic layer and the tunnel barrier layer are substantially coplanar.

6. The head according to claim 1 wherein the first electrical lead is formed directly on the substrate and wherein the antiferromagnetic layer is located between the first electrical lead and the fixed ferromagnetic layer, the fixed ferromagnetic layer being formed directly on and in contact with the antiferromagnetic layer, whereby the magnetization direction of the fixed ferromagnetic layer is fixed by interfacial exchange coupling with the antiferromagnetic layer.

7. The head according to claim 1 wherein the magnetization direction of the sensing ferromagnetic layer is generally parallel to the sensing surface in the absence of an applied magnetic field.

8. The head according to claim 1 further comprising:
a biasing ferromagnetic layer for longitudinally biasing the magnetization direction of the sensing ferromagnetic layer in a direction generally perpendicular to the magnetization direction of the fixed ferromagnetic layer in the absence of an applied magnetic field; and
an electrically insulating layer located between the biasing and sensing ferromagnetic layers for electrically isolating the biasing layer from the sensing layer; and wherein the electrical leads are electrically isolated from the biasing layer by the insulating layer, whereby when a sense current is passed between the fixed ferromagnetic layer and the sensing ferromagnetic layer it passes generally perpendicularly through the tunnel barrier layer without passing into the biasing layer.

9. The head according to claim 1 wherein the read head is part of an integrated read/write head of the type wherein the read head is shielded from the write head and wherein said substrate is a first shield for the read head.

10. The head according to claim 9 further comprising a layer of electrically insulative gap material formed on the first shield and wherein the first electrical lead is formed on the layer of gap material.

11. The head according to claim 1 further comprising a second substrate, wherein the first lead, the sensing ferromagnetic layer, the tunnel barrier layer, and the second lead form a stack of layers located between the first and second substrates, and further comprising insulative material located between said stack and the first and second substrates.

12. The head according to claim 11 wherein the read head is part of an integrated read/write head of the type wherein the read head is magnetically shielded and wherein the second substrate is a second shield separating the read head from the write head.

13. The head according to claim 1 further comprising sense circuitry connected to the first and second leads.

14. The head according to claim 1 wherein the substrate is a first electrically conducting magnetic shield and wherein the first lead is formed on the first shield, whereby an electrically conductive path is provided between the first shield and the first lead.

15. The head according to claim 14 further comprising a second electrically conducting magnetic shield formed on the second lead, whereby an electrically conductive path is provided from the first shield to the first lead and through the tunnel barrier layer to the second lead and the second shield.

16. The head according to claim 1 wherein the head is the type for sensing data from a magnetic recording disk and further comprising an air-bearing slider having an air-bearing surface (ABS) facing the surface of the disk when data from the disk is being read by the head and a trailing end surface generally perpendicular to the ABS, and wherein the slider trailing end surface is the substrate on which the first electrical lead is formed and the slider ABS is the sensing surface of the head.

17. A magnetic tunnel junction magnetoresistive read head for sensing data magnetically recorded on a medium when connected to sense circuitry, the head having a substantially planar sensing surface that is aligned generally parallel to the surface of the medium when the magnetically recorded data is being sensed, the head comprising:
a substrate having an edge forming part of the sensing surface;
a first electrically conductive lead formed on the substrate;
a fixed ferromagnetic layer formed on the first lead and having a front edge substantially coplanar with the sensing surface and a back edge located farther than the front edge from the sensing surface;
an antiferromagnetic layer in contact with the fixed ferromagnetic layer for fixing the magnetization direction of the fixed ferromagnetic layer by interfacial exchange coupling along a preferred direction so it is substantially prevented from rotation in the presence of an applied magnetic field from the medium, the antiferromagnetic layer having a front edge substantially coplanar with the sensing surface;
a sensing ferromagnetic layer having a sensing edge substantially coplanar with the sensing surface and a back edge, the magnetization direction of the sensing ferromagnetic layer being oriented in a direction generally perpendicular to the magnetization direction of the fixed ferromagnetic layer and generally parallel to the sensing surface in the absence of an applied magnetic field and being free to rotate in the presence of an applied magnetic field from the medium;
an insulating tunnel barrier layer located between and in contact with the fixed and sensing ferromagnetic layers for permitting tunneling current in a direction generally perpendicular to the fixed and sensing ferromagnetic layers, the tunnel barrier layer having a front edge substantially coplanar with the sensing surface and a back edge located farther than the tunnel barrier layer front edge from the sensing surface;
a second electrically conductive lead formed on the sensing ferromagnetic layer; and
wherein the back edge of the sensing ferromagnetic layer is located farther than the back edge of the tunnel barrier layer from the sensing surface if the back edge of the tunnel barrier layer is closer to the sensing surface than the back edge of the fixed ferromagnetic layer, and farther from the sensing surface than the back edge of the fixed ferromagnetic layer if the back edge of the fixed ferromagnetic layer is closer to the sensing surface than the back edge of the tunnel barrier layer.

18. The head according to claim 17 wherein the back edges of the antiferromagnetic layer, the fixed ferromagnetic layer and the tunnel barrier layer are substantially coplanar.

19. The head according to claim 17 wherein the back edge of the tunnel barrier layer and the back edge of the fixed ferromagnetic layer are substantially coplanar and wherein the back edge of the sensing ferromagnetic layer is located farther than the coplanar back edges of the tunnel barrier layer and fixed ferromagnetic layer from the sensing surface.

20. The head according to claim 17 wherein the first electrical lead is formed directly on the substrate and wherein the antiferromagnetic layer is located between the first electrical lead and the fixed ferromagnetic layer, the fixed ferromagnetic layer being formed directly on and in contact with the antiferromagnetic layer.

21. The head according to claim 17 further comprising:
a biasing ferromagnetic layer for longitudinally biasing the magnetization direction of the sensing ferromagnetic layer in a direction generally perpendicular to the magnetization direction of the fixed ferromagnetic layer in the absence of an applied magnetic field; and
an electrically insulating layer located between the biasing and sensing ferromagnetic layers for electrically isolating the biasing layer from the sensing layer; and wherein the electrical leads are electrically isolated from the biasing layer by the insulating layer, whereby when a sense current is passed between the fixed ferromagnetic layer and the sensing ferromagnetic layer it passes generally perpendicularly through the tunnel barrier layer without passing into the biasing layer.

22. The head according to claim 17 wherein the read head is part of an integrated read/write head of the type wherein the read head is magnetically shielded and wherein said substrate is a first shield for the read head.

23. The head according to claim 22 further comprising a layer of electrically insulative gap material formed on the first shield and wherein the first electrical lead is formed on the layer of gap material.

24. The head according to claim 17 further comprising sense circuitry connected to the first and second leads.

25. The head according to claim 17 wherein the substrate is a first electrically conducting magnetic shield and wherein the first lead is formed on the first shield, and further comprising a second electrically conducting magnetic shield formed on the second lead, whereby an electrically conductive path is provided from the first shield to the first lead and through the tunnel barrier layer to the second lead and the second shield.

26. The head according to claim 17 wherein the head is the type for sensing data from a magnetic recording disk and further comprising an air-bearing slider having an air-bearing surface (ABS) facing the surface of the disk when data from the disk is being read by the head and a trailing end surface generally perpendicular to the ABS, and wherein the slider trailing end surface is the substrate on which the first electrical lead is formed and the slider ABS is the sensing surface of the head.

* * * * *